United States Patent
Liu et al.

(10) Patent No.: US 11,873,872 B2
(45) Date of Patent: Jan. 16, 2024

(54) RESTRICTING DEVICE FOR RESTRICTING BRAKE ROTOR FROM ROTATING DURING MAINTENANCE

(71) Applicants: Kyle Liu, Taichung (TW); Ishihara Youzou, Tsushima (JP)

(72) Inventors: Kyle Liu, Taichung (TW); Ishihara Youzou, Tsushima (JP)

(73) Assignee: JEOUTAY LIU INDUSTRIAL CO., LTD., Taichung (TW)

(*) Notice: Subject to any disclaimer, the term of this patent is extended or adjusted under 35 U.S.C. 154(b) by 552 days.

(21) Appl. No.: 17/152,686

(22) Filed: Jan. 19, 2021

(65) Prior Publication Data
US 2021/0140500 A1 May 13, 2021

Related U.S. Application Data

(63) Continuation-in-part of application No. 16/893,349, filed on Jun. 4, 2020, now abandoned, which is a continuation-in-part of application No. 16/165,032, filed on Oct. 19, 2018, now abandoned.

(51) Int. Cl.
*F16D 65/00* (2006.01)
*F16D 65/18* (2006.01)
*F16D 63/00* (2006.01)

(52) U.S. Cl.
CPC ........ *F16D 65/0043* (2013.01); *F16D 63/006* (2013.01); *F16D 65/18* (2013.01)

(58) Field of Classification Search
CPC .... F16D 65/0043; F16D 2127/06; B60T 3/00; Y10T 70/5841; Y10T 70/585; B62H 5/18
See application file for complete search history.

(56) References Cited

U.S. PATENT DOCUMENTS

2005/0103584 A1* 5/2005 Hogesta .................. B62J 25/06
188/265

* cited by examiner

*Primary Examiner* — Jeremy R Severson

(57) ABSTRACT

A restriction device includes a bridge including a connection portion and a locking portion respective formed on two ends thereof. The connection portion includes a protrusion on the outside of the bridge. The protrusion is to be connected to one of the connection parts on the hub. The locking portion includes a tubular part on the inside of the bridge. The tubular part is located beyond the outer periphery of the hub. A space is formed between the inside of the bridge and the tubular part so as to accommodate the hub on the disk body when the protrusion is connected to one of the connection parts on the hub. The tubular part contacts one of two ends of the brake caliper to restrict rotation of brake disk.

4 Claims, 7 Drawing Sheets

RESTRICTING DEVICE FOR RESTRICTING BRAKE ROTOR FROM ROTATING DURING MAINTENANCE

BACKGROUND OF THE INVENTION

1. Fields of the Invention

The present invention is a Continuation-in-Part application of applicant's former patent application with the U.S. application Ser. No. 16/893,349, filed on Jun. 4, 2020.

2. Descriptions of Related Art

JP 2000-274511 discloses a differential which is connected to two axles that are respectively connected to two wheels. A set of gears secures the differential by bolts. The set of gears transfers the output energy from the engine to the differential so as to drive the wheels. JP2000-274511 provides a device that replaces the differential and includes a portion that is connected to the set of gears, and another portion that is connected to the axles so as to restrict rotation of the axles.

When the bolts are to be removed, the axles rotate freely, this requires one person to secure the brake rotor that is connected with the axle, and another person to remove the bolts. In other words, this task requires two persons to finish and therefore reduces the efficiency or work.

U.S. Pat. No. 9,376,300 discloses an end piece of wheel cylinder piston adjustor and which discloses two rock arms which are pivotably located between a seat body and a guide body. The guide body includes two slots. Each rock arm has a pin-shaped locating body which movably extends through the slot corresponding thereto. The rock arm is pivotably connected along the periphery of the seat body. When moving the pin-shaped locating bodies along the two slots, the distance between the pin-shaped locating bodies is adjusted.

The end piece is used to push the wheel cylinder piston back into the piston room for replacing the worn linings with new ones.

US 2017/0158167 to Speed discloses a theft prevent for wheels and cars. The disclosure of Speed is used to cover the nuts on the hub on the front side of the wheel by the metal plate so as to prevent, the theft from unscrewing the nuts. The disclosure of Speed includes two bars extending through a metal plate, and each bar has a hook. The two bars extend beyond the first and second sides of the metal plate. When in use, the two bars extend through the wheel and hook the rear side of the wheel by the hooks so as to position the metal plate to cover up the bolts on the hub of the wheel, such that the bolts on the hub cannot be removed.

The present invention is intended to provide a restriction device that is installed to the brake rotor so as to restrict rotation of the shaft and the brake disk of the brake rotor. Therefore, the technicians are able to access the nuts and to unscrew the nuts by restricting the wheel from rotating.

SUMMARY OF THE INVENTION

The present invention relates to a restriction device for restricting brake rotor from rotating. The brake rotor includes a brake disk which includes a disk body and a hub which protrudes axially from the center of the disk body. A brake caliper is mounted to outside of the disk body and overlapped a portion of the disk body. The brake caliper is cooperated with brake pads which are located between the brake disk and they brake caliper. The hub includes multiple connection parts. The restriction device comprises a bridge including a connection portion formed to the first end of the bridge, and a locking portion is formed to the second end of the bridge. The connection portion includes a protrusion which extends from the outside of the bridge and is to be connected to connection parts on the hub. The locking portion includes tubular part which is connected to the inside of the bridge. The tubular part is located beyond the outer periphery of the hub. The tubular part contacts one of two ends of the brake caliper to restrict rotation of brake disk. A space is formed between the inside of the bridge and the tubular part. The space extends through the first end of the bridge. The space accommodates the hub on the disk body when the protrusion is adapted to be connected to connection parts on the hub.

Preferably, a locking member extends through the bridge and is connected to the tubular part.

Preferably, the bridge includes a first hole and a second hole defined therethrough. The first hole communicates with the space and is located corresponding to the protrusion. The second hole is located corresponding to the tubular part. The first hole allows one of the connection parts on the hub to extend through the first hole from the inside of the bridge. A locking member extends through the second hole and is connected with a nut from the outside of the bridge.

The present invention requires only one person to remove bolts of the brake rotor.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 2:
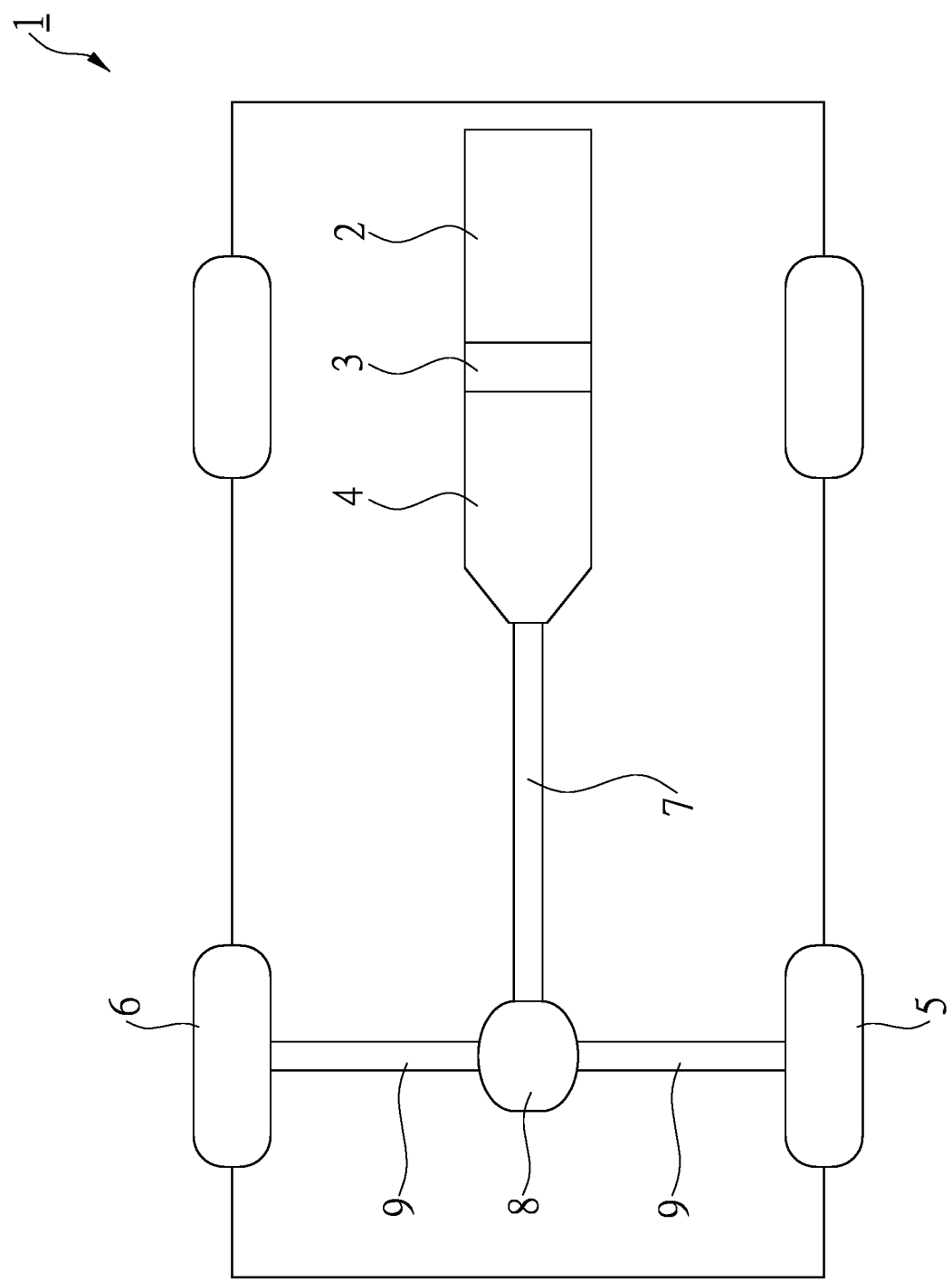
FIG. 2 shows the wheel drive system of a vehicle.

Referring to FIG. 2, the wheel drive system of a vehicle 1 includes an engine 2, a clutch 3, a drive shaft 7 and a transmission 4. A differential 8 is connected to the drive shaft 7, and the differential 8 is connected to two wheels 5, 6 by two axles 9.

Figure 3:
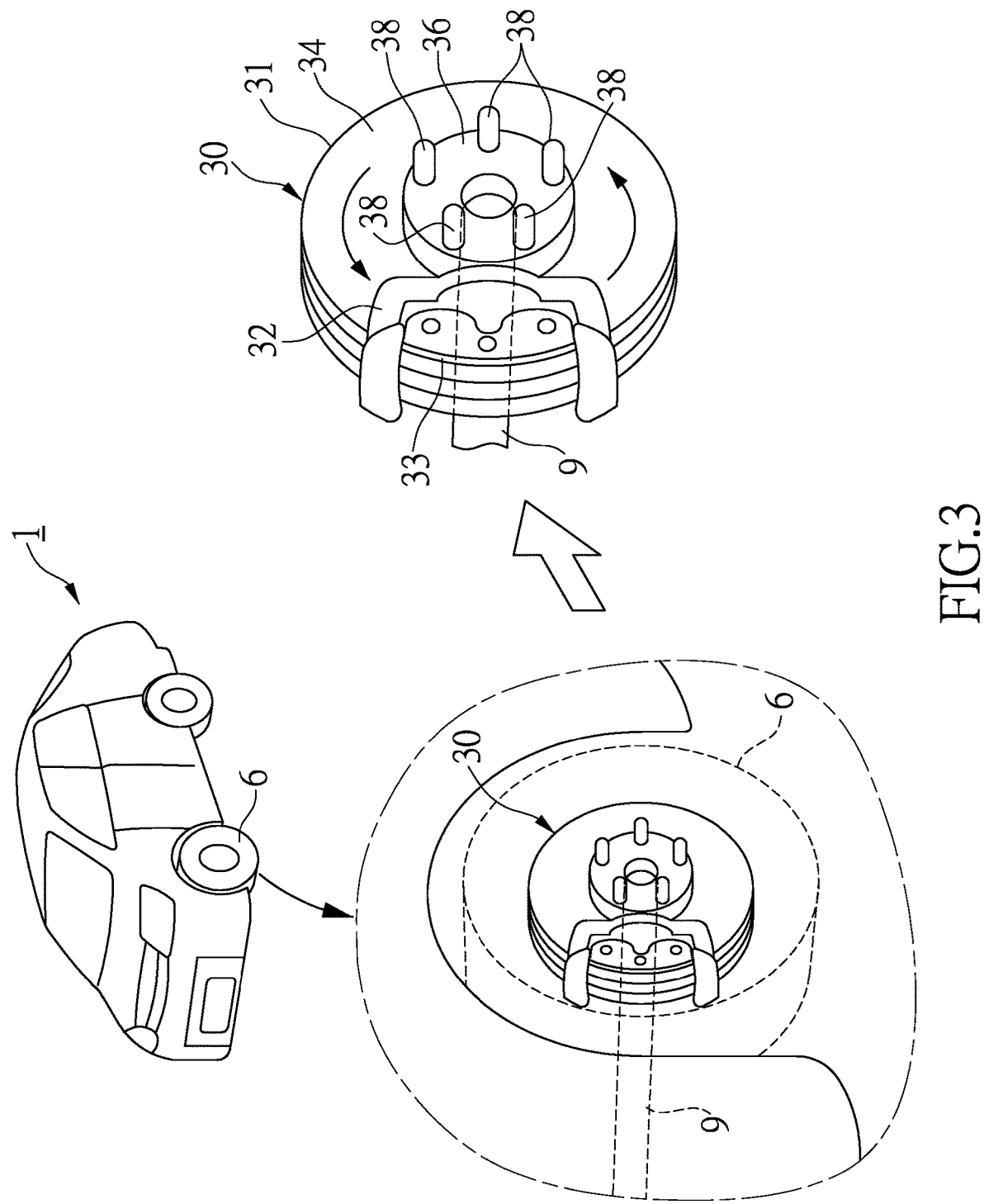
FIG. 3 illustrates the brake rotor and brake caliper of a vehicle.

As shown in FIG. 3, each wheel 5/6 is cooperated with a brake rotor 30 which are driven by hydraulic cylinders to brake the vehicle 1. The output of the engine 2 is transferred to the drive shaft 7, and the differential 8 receives the power from the drive shaft 7 and drives the two axles 9 to rotate the two wheels 5, 6.

The brake rotor 30 as shown in 3 includes a brake disk 31 which includes a disk body 34 and a hub 36 protrudes axially from the center of the disk body 34. A brake caliper 32 is located outside of the disk body 34 and is cooperated with brake pads 33 which are used to stop the rotation of the brake disk 31. The thickness of the hub 36 is larger than that of the brake disk 31. The brake caliper 32 is mounted to a portion of the brake disk 31 and the brake pads 33 are located between the brake disk 31 and the brake caliper 32 so that when the brake caliper 32 is activated, the brake pads 33 are moved to touch the brake disk 31 to stop the wheel 5/6. The hub 36 includes multiple connection parts 38 which include bolts and nuts.

Figure 1:
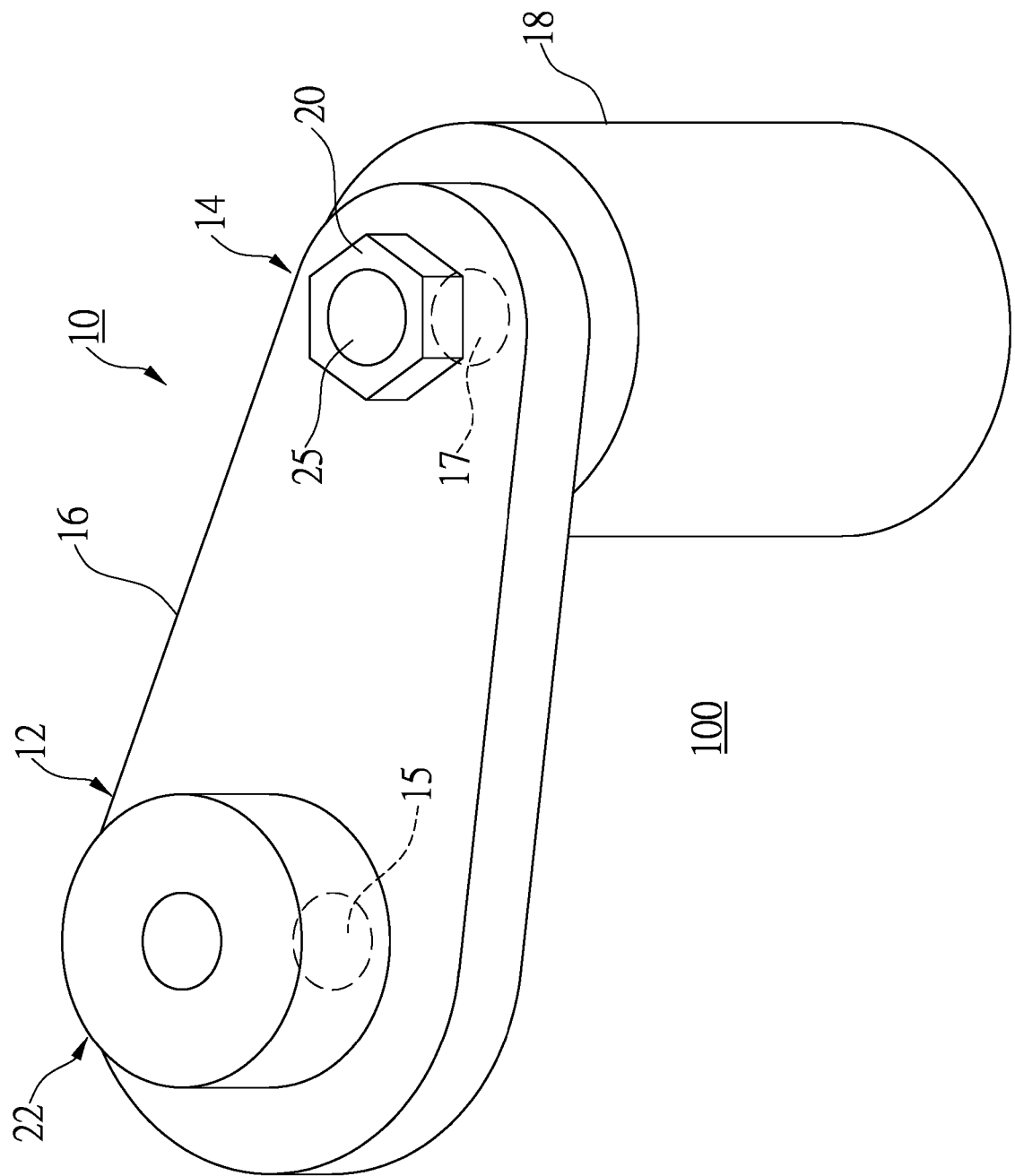
FIG. 1 is a perspective view to show the restriction device of the present invention.
Figure 1A:
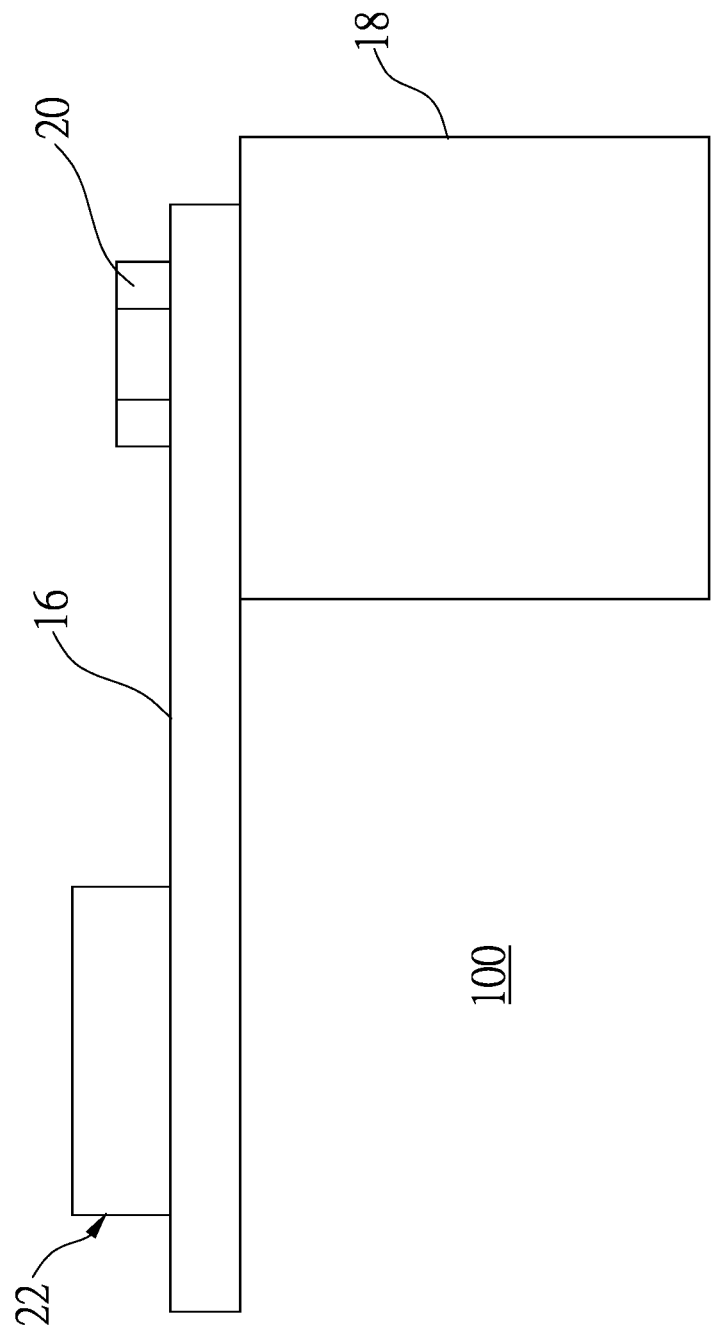
FIG. 1A shows a side view of the restriction device of the present invention.

As shown in FIGS. 1 and 1A, the restriction device 10 of the present invention comprises a bridge 16 which is an elongate board and has a certain thickness. The bridge 16 includes a connection portion 12 formed to the first end of the bridge 16, and a locking portion 14 is formed to the second end, of the bridge 16. The bridge 16 is an elongate board and includes a first hole 15 and a second hole 17 defined there through. The connection portion 12 includes a protrusion 22 which extends perpendicularly from the outside of the bridge 16 and is to be connected to one of the connection parts 38 on the hub 36.

Figure 4:
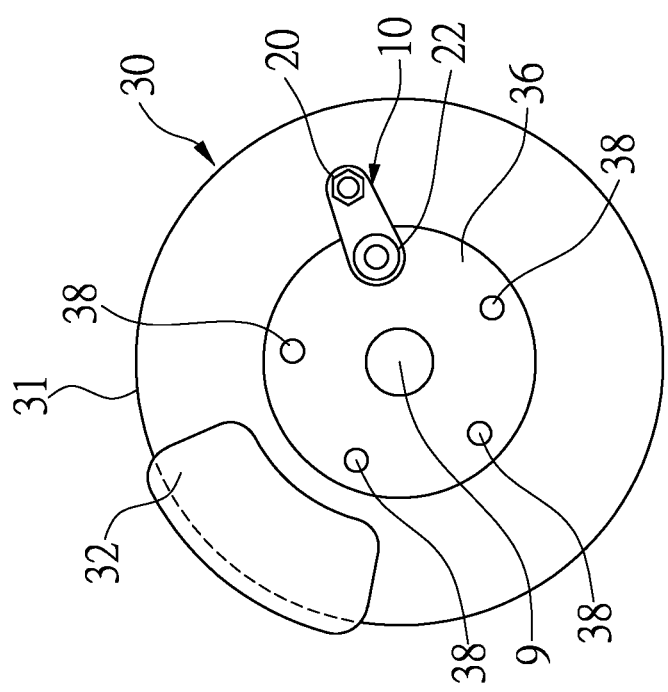
FIG. 4 shows the restriction device of the present invention is installed to the brake rotor.
Figure 5:
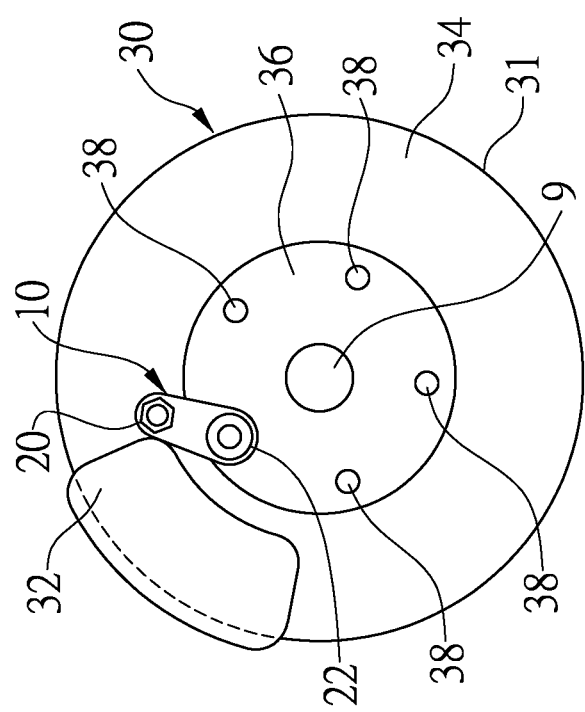
FIG. 5 shows that the tubular part of the restriction device of the present invention contacts one of two ends of the brake caliper.

The locking portion 14 includes a tubular part 18 which is perpendicularly connected to the inside of the bridge 16. The tubular part 18 is to be in contact with the brake caliper 32 to restrict rotation of brake disk 31. A space 100 is formed between the inside of the bridge 16 and the tubular part 18 as shown in FIG. 1A. The space 100 extends through the first end of the bridge 16. Preferably, the inside of the bridge 14 is a flat face, and the space 100 is an empty space without any part located in the space 100. Therefore, the space 100 can accommodate the hub 36 on the disk body 34 when the protrusion 22 is connected to one of the connection parts 38 on the hub 36 as shown in FIGS. 4 and 5.

The first hole 15 is located corresponding to the protrusion 22, and the second hole 17 is located corresponding to the tubular part 18. The protrusion 22 of the connection portion 12 is connected to one of the connection parts 38 on the hub 36. The connection part 38 on the hub 36 extends through the first hole 15 from the inside of the bridge 16 and is restricted by the protrusion 22 on the outside of the bridge 16.

The tubular part 18 includes a locking member 25 which extends through the second hole 17 and is locked by a nut 20 from the outside of the bridge 16. The brake disk 31 is restricted from rotating when the tubular part 18 contacts the brake caliper 32.

When unscrewing the bolts of the axle 9 and the differential 8, the axle 9 freely rotates and this may affect the maintenance processes. As shown in FIG. 4, when removing the bolts and nuts that connect the center of the brake disk 31 to the axle 9, the brake disk 31 and the axle 9 rotate freely as well. Although the technician can use a wrench to control the rotation of the brake disk 31, but this is not an easy job. The same problem happens when removing the bolts connecting the axle 9 and the differential 8. Therefore, it requires two technicians to do the task. On the contrary, only one technician is required when using the restriction device 10 of the present invention.

When using the restriction device of the present invention, the wheel is removed and the connection parts 38 are exposed. As shown in FIG. 4, the technician chooses one of the connection parts 38 on the hub 36, and allows that chosen connection part 38 to extend through the first hole 15 from the inside of the bridge 16 and is restricted by the protrusion 22 on the outside of the bridge 16. The second end of the bridge 16 extends beyond the outer periphery of the hub 36, and the tubular part 18 is located beyond the outer periphery of the hub 36. The bolts connecting the axle 9 and the differential 8 are then rotated, and the brake disk 31 is therefore rotated an angle. The tubular part 18 then contacts one of two ends of the caliper 32 as shown in FIG. 5. Because the tubular part 18 is stopped by the caliper the axle 9 and the brake disk 31 cannot rotate. Therefore, the bolts connecting the shaft 9 and the differential 8 can be easily unscrewed.

Figure 6:
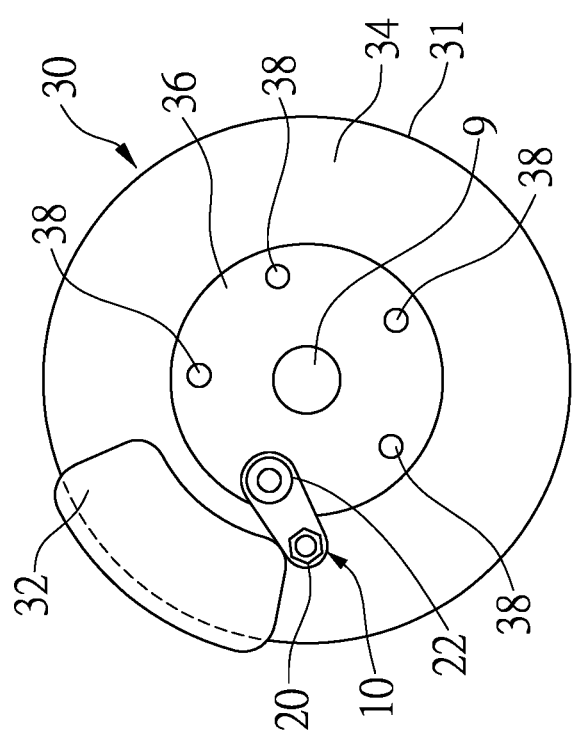
FIG. 6 shows that the tubular part of the restriction device of the present invention contacts the other one of two ends of the brake caliper.

After the maintenance, and the bolts are rotated in reverse direction to fasten the axle 9 to the differential 8, the brake disk 31 will rotate, and the tubular part 18 is moved to another position to contact the other one of the two ends of the caliper 32 as shown in FIG. 6. Therefore, the brake disk 31 is restricted from rotating, and the axle 9 does not rotate either. The bolts connecting the shaft 9 and the differential 8 can be easily fastened and connected to the nuts. After the task is finished, the nut 20 on the locking portion 14 is removed, the restriction device 10 can then be removed from the brake disk 31. Only one technician is required when using the restriction device 10 of the present invention.

When using the restriction device 10 of the present invention, the wheel is removed from the hub 36 and the bolts and nuts to be loosened are exposed. The bridge 16 does not cover up the nuts on the hub 36. The inside of the bridge 16 preferably is a flat face, and the space 100 is an empty space without any part located in the space 100. Therefore, when the space 100 accommodates a portion of the hub 36 as shown in FIG. 4, the inside of the bridge 16 contacts the hub 36 and is stable and does shake or swing.

While we have shown and described the embodiment in accordance with the present invention, it should be clear to those skilled in the art that further embodiments may be made without departing from the scope of the present invention.

What is claimed is:

1. A restriction device for restricting brake rotor from rotating, the brake rotor including a brake disk, the brake disk including a disk body and a hub which protrudes axially from a center of the disk body, a brake caliper being mounted to outside of the disk body and overlapped a portion of the disk body, the brake caliper cooperated with brake pads which are located between the brake disk and the brake caliper, the hub including multiple connection parts which are bolts, the restriction device comprising:

a bridge including a connection portion formed to a first end of the bridge, a locking portion formed to a second end of the bridge, the connection portion having a protrusion which extends from an outside of the bridge and adapted to be connected to one of the connection parts on the hub, the locking portion having a tubular part which is connected to an inside of the bridge, the second end of the bridge adapted to extend beyond an outer periphery of the hub, the tubular part configured to be located beyond the outer periphery of the hub, the tubular part configured to contact one of two ends of the brake caliper to restrict rotation of brake disk, a space being formed between the inside of the bridge and the tubular part, the space extending through the first end of the bridge, the space configured to accommodate the huh on the disk body when the protrusion is connected to the connection parts on the hub.

2. The restriction device as claimed in claim 1, wherein a locking member is a screw and extends through the bridge and is connected to the tubular part.

3. The restriction device as claimed in claim 1, wherein the bridge includes a first hole and a second hole defined therethrough, the first hole communicates with the space and is located corresponding to the protrusion, the second hole is located corresponding to the tubular part, the first hole adapted to accommodate one of the connection parts on the hub from the inside of the bridge, a locking member is a screw and extends through the second hole and is connected with a nut from the outside of the bridge.

4. The restriction device as claimed in claim 1, wherein the inside of the bridge is a flat face, the space is an empty space without any part located in the space.

\* \* \* \* \*